(12) United States Patent
Hachiya et al.

(10) Patent No.: US 8,264,950 B2
(45) Date of Patent: Sep. 11, 2012

(54) PACKET FORWARDING DEVICE AND CONTROL CIRCUIT THEREOF

(75) Inventors: Koji Hachiya, Fukuoka (JP); Tetsuo Ehara, Fukuoka (JP); Yasayuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 12/827,456

(22) Filed: Jun. 30, 2010

(65) Prior Publication Data
US 2010/0265831 A1 Oct. 21, 2010

Related U.S. Application Data

(63) Continuation of application No. PCT/JP2008/050324, filed on Jan. 15, 2008.

(51) Int. Cl.
*G01R 31/08* (2006.01)
(52) U.S. Cl. ........ 370/218; 370/221; 370/242; 370/249; 370/389; 370/401
(58) Field of Classification Search .................. None
See application file for complete search history.

(56) References Cited

U.S. PATENT DOCUMENTS

| 2005/0265330 A1 | 12/2005 | Suzuki et al. |
| 2008/0304407 A1* | 12/2008 | Umansky et al. ............. 370/222 |
| 2009/0147777 A1* | 6/2009 | Owens et al. ................. 370/389 |

FOREIGN PATENT DOCUMENTS

| JP | 2002-374288 | 12/2002 |
| JP | 2005-347943 | 12/2005 |

OTHER PUBLICATIONS

International Search Report dated Feb. 12, 2008 for the corresponding International Application No. PCT/JP2008/050324.

* cited by examiner

*Primary Examiner* — Bob Phunkulh
(74) *Attorney, Agent, or Firm* — Katten Muchin Rosenman LLP

(57) ABSTRACT

A packet forwarding device includes a storage that stores a path selection table in which link numbers of a Work path and a Protection path for each flow number of a transfer packet, a flag that indicates whether the link is made up of a plurality of physical lines, a link aggregation number that identifies an aggregation of the plurality of physical lines, and destination information are set in association with one another, a link status table, a node status table, and an LAG status table, and a path selection processor that selects a path that outputs the packet on the basis of the information.

10 Claims, 8 Drawing Sheets

FIG.10

```
> display table
>
> ─────────────────────────────────────────────
> Path selection table
> ─────────────────────────────────────────────
> Flow#   :  Link#      Node#      LAG#       Transmit#
> 0x0000 :  0x0000     0x0000     0x0000     0x0000
> 0x0001 :  0x0100     0x0200     0x1000     0x0400
>                          :
> ─────────────────────────────────────────────
> Link Status table
> ─────────────────────────────────────────────
> Link#   : Status
> 0x0000 : 00001000   01000000   00000000   00000000
> 0x0020 : 00000000   00001010   00000000   00000000
>                          :
```

PACKET FORWARDING DEVICE AND CONTROL CIRCUIT THEREOF

CROSS-REFERENCE TO RELATED APPLICATION(S)

This application is a continuation of International Application No. PCT/JP2008/050324, filed on Jan. 15, 2008, the entire contents of which are incorporated herein by reference.

FIELD

The embodiment discussed herein is directed to a packet forwarding device and a control circuit thereof that perform switching between a Work path and a Protection path of an MPLS (Multi-protocol Label Switching) network.

BACKGROUND

In recent years, an MPLS network that performs packet transfer using a label switching technique has been widely utilized. The MPLS network sets a Work path and a Protection path as different paths. Therefore, even when the Work path has a fault, the MPLS network can communicate by using the Protection path.

However, to realize a network having high reliability by using the technique, it is important to switch from the Work path to the Protection path at high speed and to shorten the time that the communication status is disconnected as much as possible when a fault occurs. A technology for speeding up the switching between paths has been known as disclosed in, for example, Japanese Laid-open Patent Publication No. 2002-374288. In the technology disclosed in Japanese Laid-open Patent Publication No. 2002-374288, when the fault of a current path (Work path) is detected, high-speed switching to a preliminary path (Protection path) is realized by writing that the current path is shut down into a routing table.

However, a conventional path switching technology, including the above technology, cannot sufficiently cope with a link aggregation (hereinafter, LAG) function that bundles up a plurality of physical lines and treats the lines as one virtual line. A virtual line made by using LAG can continue communication without problems except that a bandwidth decreases even when a part of a physical line has a fault.

For this reason, if we want to avoid a communication disconnection even for a fraction of time when using a virtual line made by using LAG, it is preferable to maintain the status without the switching between paths when a part of a physical line has a fault. On the other hand, if we want to avoid the reduction of a bandwidth, it is preferable to perform the switching between paths when a part of a physical line has a fault.

In this way, when using a virtual line made by using LAG, whether the switching between paths should be performed depends on the purposes for which the line is being used when a part of a physical line has a fault. There is a problem in that the conventional path switching technology cannot cope with the requirement for using a virtual line made by using LAG.

SUMMARY

According to an aspect of an embodiment of the invention, a packet forwarding device that performs switching between a Work path and a Protection path of an MPLS network, includes a storage that stores therein a path selection table in which link numbers of the Work path and Protection path, a flag that indicates whether the link is made up of a plurality of physical lines, a link aggregation number for identifying an aggregation of the plurality of physical lines, and destination information are set in association with one another for each flow number of a transfer packet, a link status table in which the link number and an active or inactive state of the corresponding link are set in association with each other, and a link aggregation status table in which the link aggregation number and a value that indicates whether all of the plurality of physical lines corresponding to the link aggregation number are active are set in association with each other. The packet forwarding device also includes a path selection processor that acquires, when the flag acquired from the path selection table in accordance with a flow number of a packet acquired from an incoming path indicates that the link is made up of a plurality of physical lines, link aggregation numbers of a Work path and a Protection path from the path selection table in accordance with the flow number to refer to the link aggregation status table, selects the Work path or the Protection path of which all the physical lines are active, and acquires destination information of the selected path from the path selection table; a transfer controller that transmits the received packet to an outgoing path decided by the destination information acquired by the path selection processor; and a monitor that monitors a status of a link on each outgoing path and updates the link status table and the link aggregation status table in accordance with whether the link is active or inactive.

According to another aspect of an embodiment of the invention, a packet forwarding device that performs switching between a Work path and a Protection path of an MPLS network, includes a storage that stores therein a path selection table in which adjacent node numbers of the Work path and Protection path, a flag that indicates whether a link between the nodes is made up of a plurality of physical lines, a link aggregation number that identifies an aggregation of the plurality of physical lines, and destination information are set in association with one another for each flow number of a transfer packet, a node status table in which the node number and a status that indicates whether the node is active or inactive are set in association with each other, and a link aggregation status table in which the link aggregation number and a value that indicates whether all of the plurality of physical lines corresponding to the link aggregation number are active are set in association with each other. The packet forwarding device includes a path selection processor that acquires, when the flag acquired from the path selection table in accordance with a flow number of a packet acquired from an incoming path indicates that the link between the adjacent nodes is made up of a plurality of physical lines, link aggregation numbers of a Work path and a Protection path from the path selection table in accordance with the flow number to refer to the link aggregation status table, selects the Work path or the Protection path of which all the physical lines are active, and acquires destination information of the selected path from the path selection table; a transfer controller that transmits the received packet to an outgoing path decided by the destination information acquired by the path selection processor; and a monitor that monitors statuses of a link and a node on each outgoing path and updates the node status table and the link aggregation status table in accordance with whether the link and node are active or inactive.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 10 is a diagram illustrating a display example of information that a table display unit causes a display unit of a management terminal to display;

DESCRIPTION OF EMBODIMENT

A preferred embodiment of the present invention will be explained with reference to accompanying drawings. The present invention is not limited to the embodiment explained below.

Figure 1:
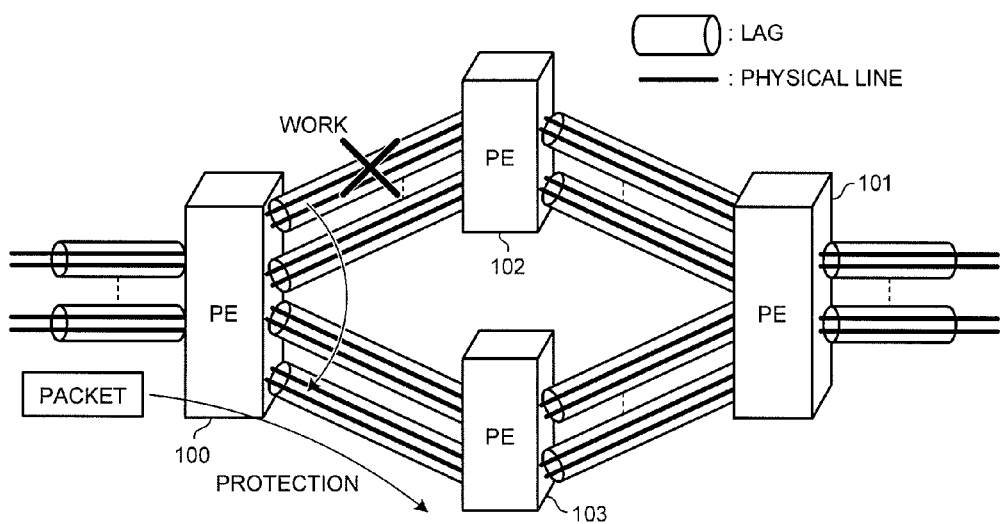
FIG. 1 is a diagram explaining an example configuration of an MPLS network and a fault recovery method.

First, it will be explained about the configuration example of an MPLS network and the brief description of a fault recovery method. FIG. 1 is a diagram explaining the configuration example of an MPLS network and a fault recovery method. As illustrated in FIG. 1, the MPLS network is configured by connecting a plurality of packet forwarding devices, which are generally referred to provider edges (hereinafter, "PEs"), by using one or a plurality of links. A link may be realized by a physical line or may be realized by a virtual line made by using LAG.

The MPLS network illustrated in FIG. 1 is configured by connecting PEs 100 to 103 by using a plurality of links. Specifically, the PE 100 and the PE 101 are arranged at positions at which they are connected with an outside network and are connected with a first path that goes through the PE 102 and a second path that goes through the PE 103. A plurality of links between the PEs is realized by a virtual line made by using LAG.

Moreover, the MPLS network illustrated in FIG. 1 includes a Protection path that bypasses a part (a link or a node) at which a fault can occur on a Work path that is a protection target. Specifically, when the path between the PE 100 and the PE 102 and between the PE 102 and the PE 101 is a Work path that is a protection target, the MPLS network includes a Protection path that has the path between the PE 100 and the PE 103 and between the PE 103 and the PE 101 in preparation to the fact that a fault occurs at the PE 102 or at the both-end links.

When a fault occurs at a link between the PE 100 and the PE 102 on the MPLS network, the PE 100 located at a branching point performs the switching between paths. Because the PE 101 located at a converging point is set to receive both of a label for Work path and a label for Protection path, the PE 100 only switches labels from a label for Work path to a label for Protection paths so as to realize a fault recovery.

The switching between paths is carried out in a link unit. When a link that has a fault is realized by a physical line, all Work paths included in the link are immediately switched to Protection paths. On the other hand, when a link that has a fault is realized by a virtual line made by using LAG, the switching between paths can be immediately performed or can be performed at a step at which all physical lines included in the link have a fault and the link cannot be perfectly used. The time at which the switching between paths is performed can be selected by a user in accordance with the type of a service provided to the link.

Figure 2:
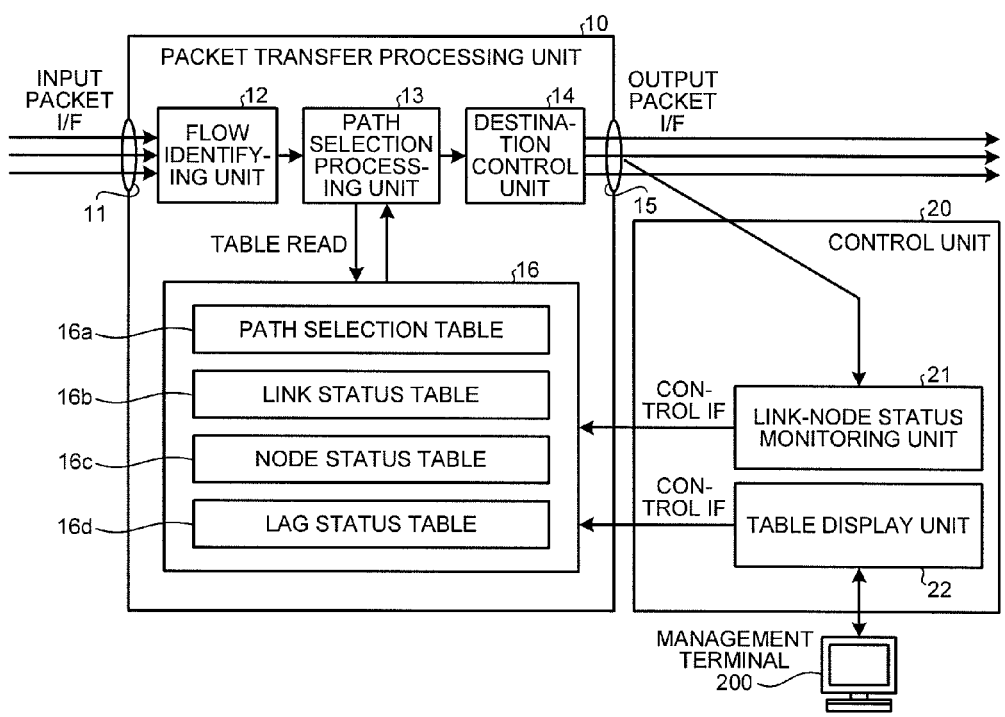
FIG. 2 is a block diagram illustrating the configuration of a packet forwarding device.

Next, it will be explained about the configuration of the PEs 100 to 103 illustrated in FIG. 1. Because the PEs 100 to 103 have the same configuration, the configuration is explained by using the PE 100 as an example. FIG. 2 is a block diagram illustrating the configuration of the PE 100. As illustrated in FIG. 2, the PE 100 includes a packet transfer processing unit 10 and a control unit 20.

The packet transfer processing unit 10 includes an input packet interface (hereinafter, "input packet I/F") 11, a flow identifying unit 12, a path selection processing unit 13, a destination control unit 14, an output packet interface (hereinafter, "output packet I/F") 15, and a storage unit 16. Moreover, the storage unit 16 stores therein a path selection table 16a, a link status table 16b, a node status table 16c, and an LAG status table 16d.

In the packet transfer processing unit 10, the flow identifying unit 12 determines the flow number of a packet acquired by the input packet I/F 11, the path selection processing unit 13 selects a destination path in accordance with the flow number, and the destination control unit 14 performs a control so that the packet is transferred to the path selected by the path selection processing unit 13. The path selection processing unit 13 refers to various types of tables of the storage unit 16 to select a destination path.

The control unit 20 includes a link-node status monitoring unit 21 and a table display unit 22. The link-node status monitoring unit 21 transmits a packet for status monitoring. In this way, the link-node status monitoring unit 21 monitors the statuses of other PEs connected via the output packet I/F 15 or the link statuses between the other PEs and itself. The link-node status monitoring unit 21 records a monitoring result in the link status table 16b, the node status table 16c, and the LAG status table 16d.

The table display unit 22 retrieves various types of tables of the storage unit 16 in accordance with an instruction transmitted from a management terminal 200 that is connected to the PE therefor, edits the contents, and makes the management terminal 200 display the edited contents. A display example on the management terminal 200 is later illustrated.

Figure 3:
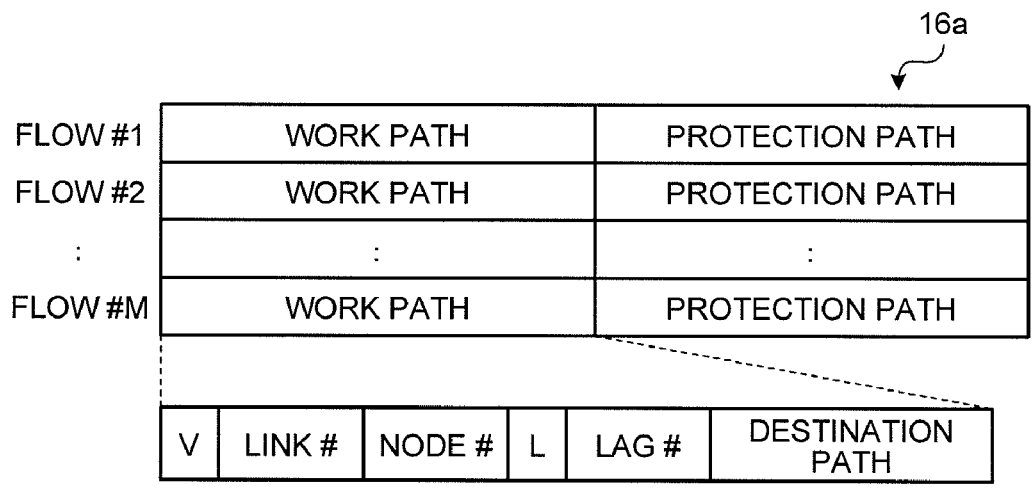
FIG. 3 is a diagram illustrating the configuration of a path selection table.

As illustrated in FIG. 3, the path selection table 16a stores as a set information related to a Work path and information related to a Protection path of a destination corresponding to the flow number by using flow numbers #1 to #M as an address. The information related to a Work path includes a validation bit V, a link #, a node #, a bit L, an LAG #, and a destination path.

The validation bit V is a flag that indicates whether the path is valid. In the present embodiment, it is assumed that the path is valid if the value of the validation bit V is "0". It is assumed that the path is invalid if the value of the validation bit V is "1". The flag is used to correspond to a global repair.

Figure 11:
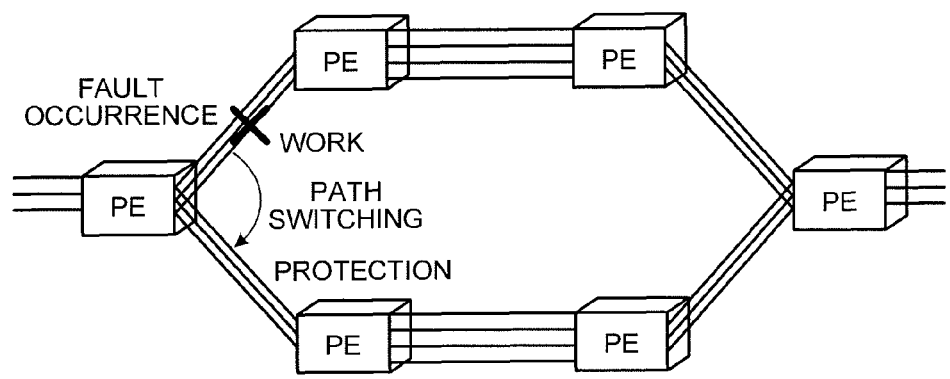
FIG. 11 is a diagram explaining a local repair.
Figure 12:
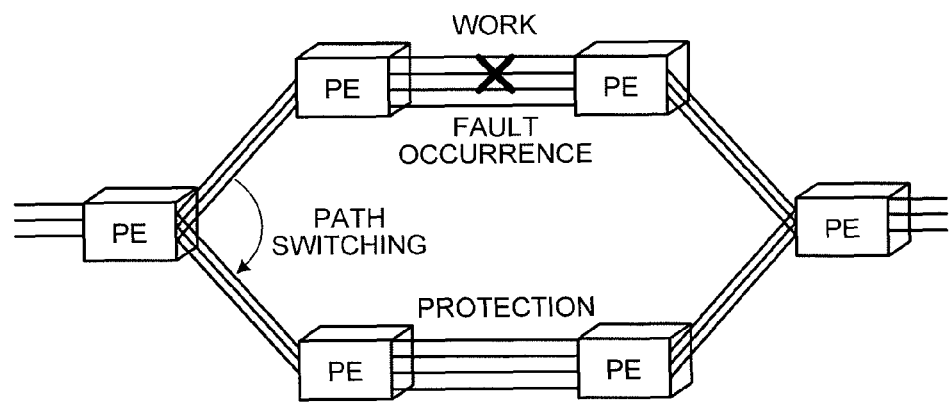
FIG. 12 is a diagram explaining a global repair.

In an MPLS network, as illustrated in FIG. 11, a PE located at a branching point of a Work path and a Protection path checks only a status between an adjacent PE and itself and performs the switching between paths (local repair). Furthermore, in addition to the local repair, as illustrated in FIG. 12, the MPLS network should cope with a global repair that checks the status of the subsequent path and perform the switching between paths. When checking the status of a path subsequent town adjacent PE and detecting the occurrence of a fault, the link-node status monitoring unit 21 sets the value of the validation bit V of a path connected to the path to "1" so that the path is not used by invalidating the path.

The link # is a number for identifying a link including the path. The node # is a number for identifying a node that is connected to the path. The bit L becomes "1" when a link including the path is realized by a virtual line made by using LAG and a user selects to immediately perform the switching between paths at the time of the occurrence of a fault. On the other hand, the bit L becomes "0" when a link including the path is realized by a physical line or a user selects to perform the switching between paths after all physical lines included in a link have a fault.

The LAG # is a number for identifying a virtual line made by using LAG. The destination path is a number for identifying an outgoing path through which a packet is transferred to the path. The information related to a Protection path includes a validation bit V, a link #, a node #, a bit L, an LAG #, and a destination path. The contents of these items are similar to those of the information related to a Work path.

Figure 4:
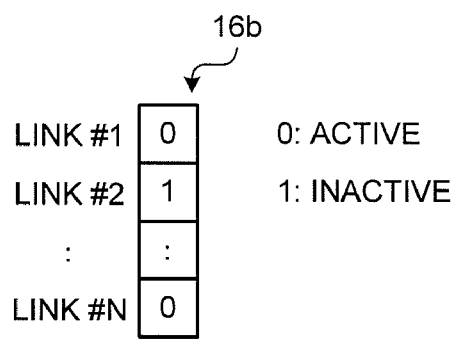
FIG. 4 is a diagram illustrating an example of a link status table.

As illustrated in FIG. 4, the link status table 16b stores a value that indicates the active and inactive state of a link corresponding to the link # by using the Link # as an address. In the present embodiment, it is assumed that "0" indicates active state and "1" indicates inactive state. These values are updated by the link-node status monitoring unit 21.

Figure 5:
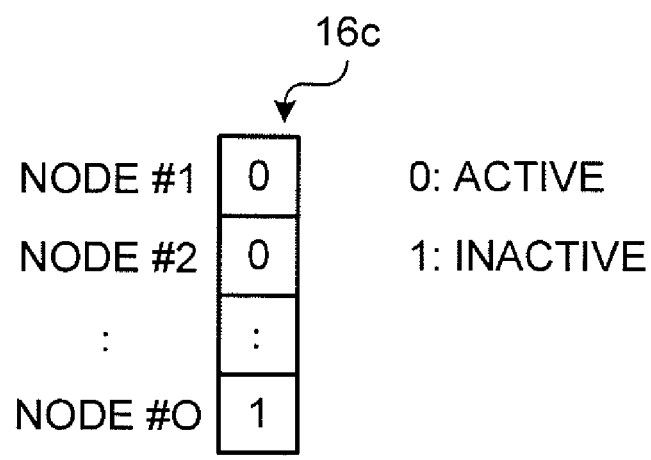
FIG. 5 is a diagram illustrating an example of a node status table.

Moreover, as illustrated in FIG. 5, the node status table 16c stores a value that indicates the active and inactive state of a node corresponding to the node # by using the Node # as an address. In the present embodiment, it is assumed that "0" indicates active state and "1" indicates inactive state. These values are updated by the link-node status monitoring unit 21.

Figure 6:
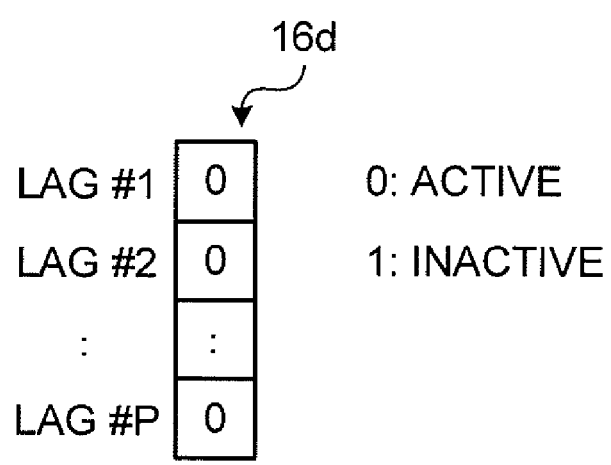
FIG. 6 is a diagram illustrating an example of an LAG status table.

Moreover, as illustrated in FIG. 6, the LAG status table 16d stores a value that indicates the active and inactive state of a virtual line corresponding to the LAG # by using the LAG # as an address. In the present embodiment, it is assumed that "0" indicates active state and "1" indicates inactive state. These values are updated by the link-node status monitoring unit 21. In this case, the fact that a virtual line made by using LAG is active means that all physical lines included in the virtual line are active. The fact that a virtual line made by using LAG is inactive means that at least one of physical lines included in the virtual line is inactive.

Figure 7:
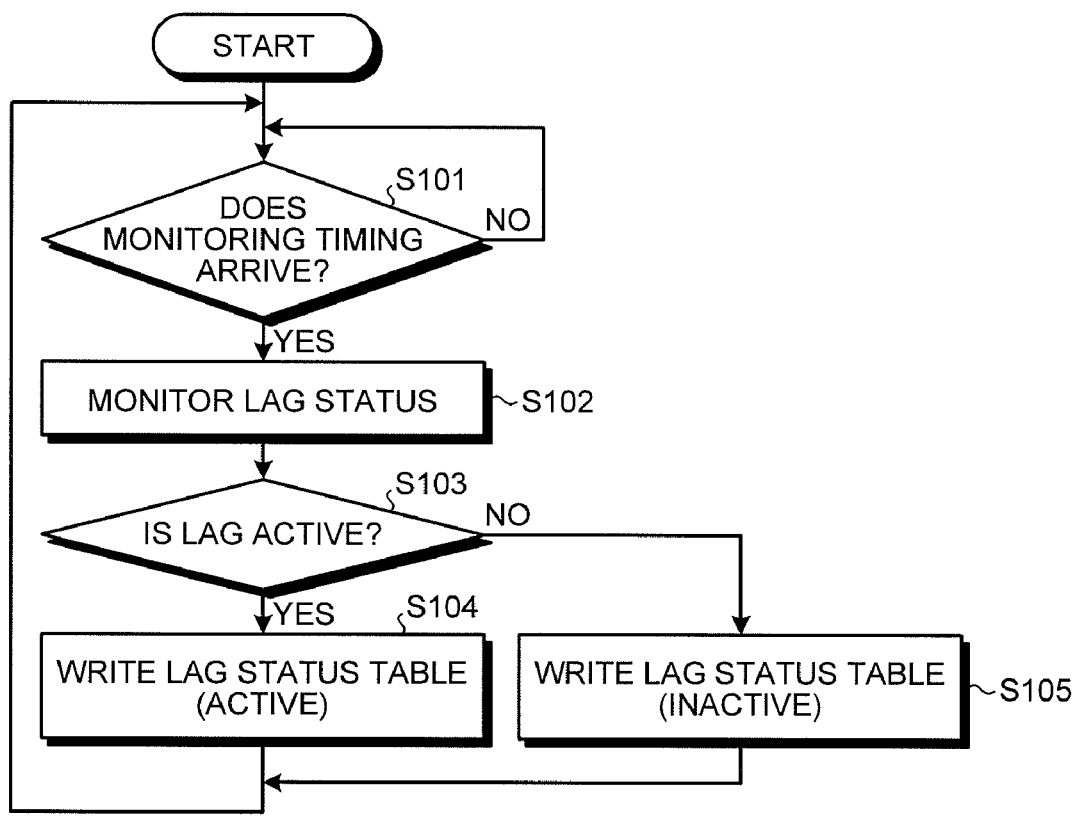
FIG. 7 is a flowchart illustrating an operation of a monitoring process of a virtual line that is made by using LAG.

Next, it will be explained about an operation of the PE 100. FIG. 7 is a flowchart illustrating an operation of a monitoring process of a virtual line made by using LAG. As illustrated in FIG. 7, the link-node status monitoring unit 21 waits the arrival of a monitoring timing (Step S101: NO). Then, when the monitoring timing arrives (Step S101: YES), the link-node status monitoring unit 21 monitors the status of the virtual line made by using LAG (Step S102) and determines whether the virtual line is active or not (Step S103).

Then, when the status of the virtual line made by using LAG is active (Step S103: YES), the link-node status monitoring unit 21 sets the value of the corresponding entry of the LAG status table 16d to "0 (active)" by using the number of the virtual line as an address (Step S104). On the other hand, when the status of the virtual line made by using LAG is inactive (Step S103: NO), the link-node status monitoring unit 21 sets the value of the corresponding entry of the LAG status table 16d to "1 (inactive)" by using the number of the virtual line as an address (Step S105). After that, the link-node status monitoring unit 21 returns the process control to Step S101 and waits the arrival of the next monitoring timing.

It should be noted that although a virtual line made by using LAG accommodates a plurality of paths, the switching between all paths accommodated in the virtual line corresponding to one entry of the LAG status table 16d can be performed by updating the content of only the one entry when the table format of the present embodiment is employed. This is extremely valid to speed up the switching between paths.

In FIG. 7, it has been explained about only a monitoring operation of a virtual line made by using LAG. However, the monitoring of a link or a node is similarly carried out by the link-node status monitoring unit 21.

Figure 8:
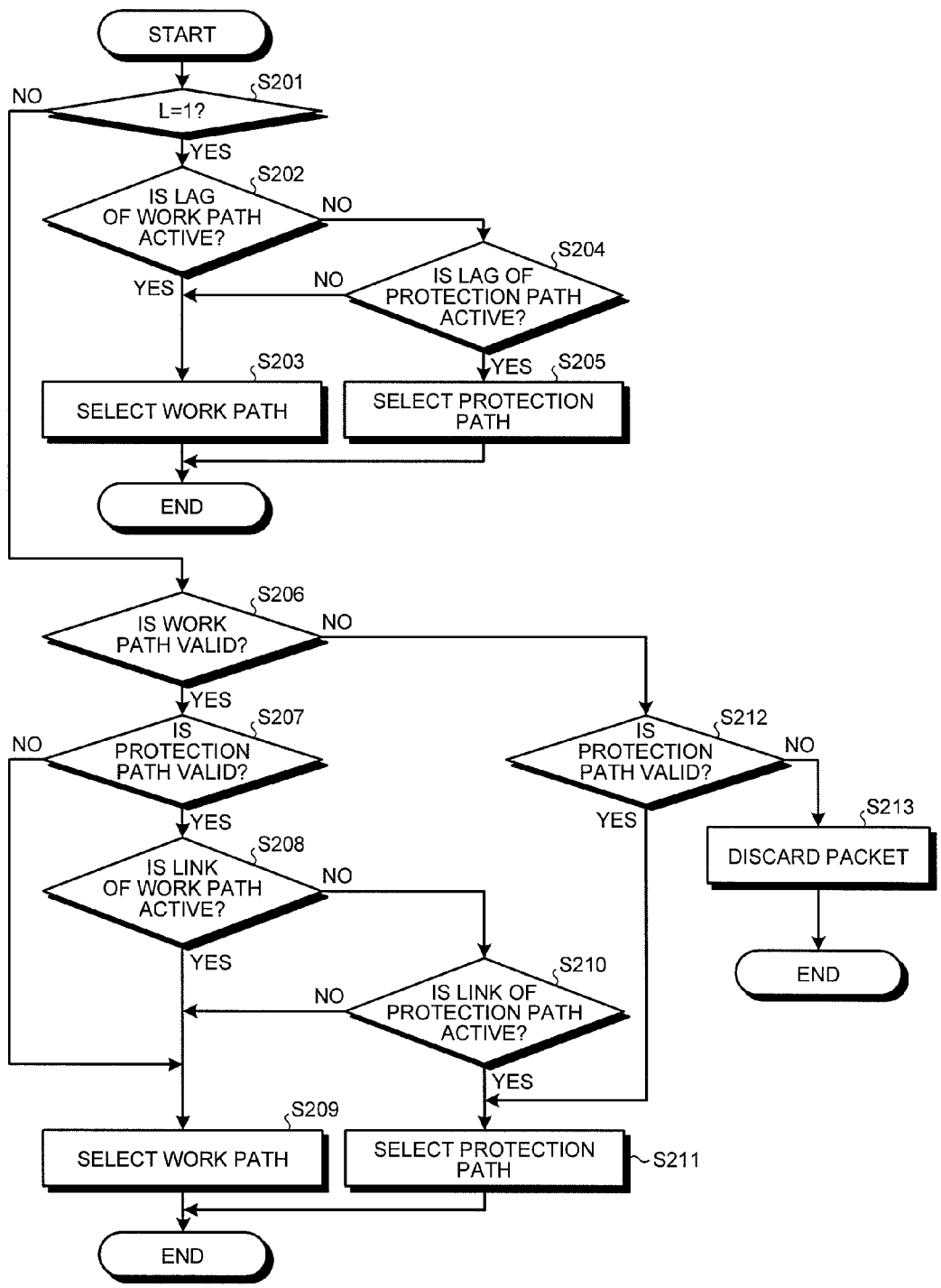
FIG. 8 is a flowchart illustrating an operation of a path selection processing unit.

FIG. 8 is a flowchart illustrating an operation of the path selection processing unit 13. As illustrated in FIG. 8, the path selection processing unit 13 refers to the path selection table 16a by using the flow number received from the flow identifying unit 12 as an address and confirms whether the L flag of a Work path is "1" (Step S201).

Then, when the L flag is "1" (Step S201: YES), the path selection processing unit 13 selects a Work path (Step S203) if the LAG of the Work path is active (Step S202: YES). On the other hand, when the LAG of the Work path is inactive (Step S202: NO), the path selection processing unit 13 selects a Protection path (Step S205) if the LAG of the Protection path is active (Step S204: YES) and selects a Work path (Step S203) if the LAG of the Protection path is inactive (Step S204: NO).

On the other hand, when the L flag is not "1" (Step S201: NO), the path selection processing unit 13 determines whether the validation bits V of a Work path and a Protection path are valid or not.

Then, when the validation bit V of the Work path is valid (Step S206: YES) and the validation bit V of the Protection path is valid (Step S207: YES), the path selection processing unit 13 performs a process for a local repair. In other words, if the link of a Work path is active (Step S208: YES), the path selection processing unit 13 selects the Work path (Step S209). When the link of a Work path is inactive (Step S208: NO), the path selection processing unit 13 selects a Protection path (Step S211) if the link of the Protection path is active (Step S210: YES) and selects a Work path (Step S209) if the link of the Protection path is inactive (Step S210: NO).

Moreover, when the validation bit V of a Work path is valid (Step S206: YES) and the validation bit V of a Protection path is invalid (Step S207: NO), the path selection processing unit 13 selects the Work path (Step S209). Moreover, when the validation bit V of a Work path is invalid (Step S206: NO), the path selection processing unit 13 selects a Protection path (Step S211) if the validation bit V of the Protection path is valid (Step S212: YES) and discard a packet (Step S213) if the validation bit V of the Protection path is invalid (Step S212: NO).

It should be noted that although the selection of a path is performed based on whether a link is active or not when an L flag is not "1" and a Work path and a Protection path are valid as described above, the selection of a path may be performed based on whether a node is active or not.

Figure 9:
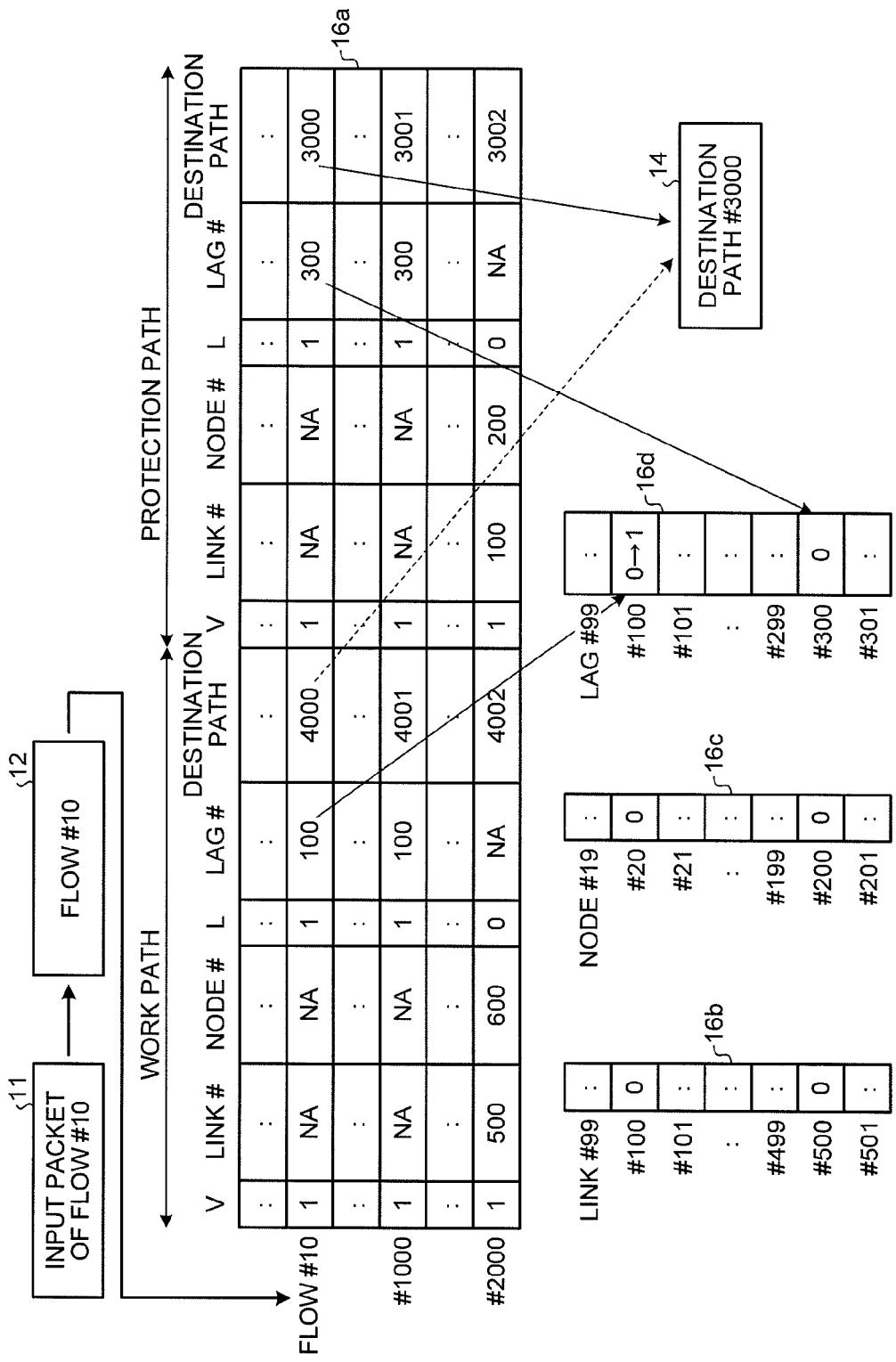
FIG. 9 is a diagram illustrating a specific example of the operation of the path selection processing unit.

FIG. 9 is a diagram illustrating the specific example of an operation of the path selection processing unit 13. In FIG. 9, for the convenience of explanation, it will be explained about the LAG status table 16d among the plurality of status tables 16b, 16c, and 16d.

As illustrated in FIG. 9, for example, when the input packet I/F 11 acquires a packet of a flow #10 from an incoming path, the flow identifying unit 12 identifies the flow of the packet received from the input packet I/F 11 and specifies the number "10" and outputs the specified flow number "10" and the received packet to the path selection processing unit 13.

The path selection processing unit 13 acquires the value of the L flag of a Work path from the path selection table 16a on the basis of the flow number "10". Then, when it is confirmed that the value of the L flag is "1", the path selection processing unit 13 acquires "100" that is the LAG # of the Work path and acquires a value that indicates the status of the virtual line made by using LAG from the LAG status table on the basis of the acquired number. If the value is "0 (active)", the path selection processing unit 13 selects the Work path and informs the destination control unit 14 of a destination path #4000.

On the other hand, when the Work path has a fault and the acquired value is "1 (inactive)", the path selection processing unit 13 acquires "300" that is the LAG # of a Protection path and acquires a value that indicates the status of the virtual line made by using LAG from the LAG status table on the basis of the acquired number. If the value is "0 (active)", the path selection processing unit 13 selects the Protection path and informs the destination control unit 14 of a destination path #3000.

Next, it will be explained about an information display performed by the table display unit 22. FIG. 10 is a diagram illustrating a display example of information that the table display unit 22 causes a display unit of the management terminal 200 to display. As illustrated in FIG. 10, the table display unit 22 retrieves the path selection table 16a, the link status table 16b, the node status table 16c, and the LAG status table 16d in accordance with a retrieving condition or the like that is transmitted from the management terminal 200, and makes the management terminal 200 display the result.

As described above, according to the present embodiment, when a link is made up of a plurality of physical lines, the switching between paths can be immediately performed by appropriately setting a flag that is provided for each path when a part of the plurality of physical lines constituting the link has a fault. Moreover, when a link is made up of a plurality of physical lines or when a link is made up of a single physical line, the switching between paths can be performed by appropriately setting a flag that is provided for each path when the link is disconnected.

In the embodiment described above, when a link is a virtual line made by using an LAG function, the switching between paths is not carried out until all physical lines included in the link are disconnected if the L flag of the path selection table 16a is set to "0". However, when the bandwidth of the link becomes smaller than a predetermined threshold value, the present embodiment can be configured to perform the switching between paths.

As described above, according to an aspect of the present invention, when a link is made up of a plurality of physical lines, the switching between paths can be immediately performed by appropriately setting a flag that is provided for each path when a part of the plurality of physical lines constituting the link has a fault.

Moreover, according to another aspect of the present invention, when a link is made up of a plurality of physical lines or when a link is made up of a single physical line, the switching between paths can be performed by appropriately setting a flag that is provided for each path when the link is disconnected.

Moreover, according to a still another aspect of the present invention, the present invention can correspond to a global repair that performs the switching between paths even when a fault occurs in a position anterior to an adjacent node.

Moreover, embodiments of applying components, expressions, or arbitrary combinations of components of the present invention to a method, an apparatus, a system, a computer program, a recording medium, a data structure, and the like are also valid as an aspect of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A packet forwarding device that performs switching between a Work path and a Protection path of an MPLS network, the packet forwarding device comprising:
   a storage that stores therein
      a path selection table in which link numbers of the Work path and Protection path, a flag that indicates whether the link is made up of a plurality of physical lines, a link aggregation number for identifying an aggregation of the plurality of physical lines, and destination information are set in association with one another for each flow number of a transfer packet,
      a link status table in which the link number and an active or inactive state of the corresponding link are set in association with each other, and
      a link aggregation status table in which the link aggregation number and a value that indicates whether all of the plurality of physical lines corresponding to the link aggregation number are active are set in association with each other;
   a path selection processor that acquires, when the flag acquired from the path selection table in accordance with a flow number of a packet acquired from an incoming path indicates that the link is made up of a plurality of physical lines, link aggregation numbers of a Work path and a Protection path from the path selection table in accordance with the flow number to refer to the link aggregation status table, selects the Work path or the Protection path of which all the physical lines are active, and acquires destination information of the selected path from the path selection table;
   a transfer controller that transmits the received packet to an outgoing path decided by the destination information acquired by the path selection processor; and
   a monitor that monitors a status of a link on each outgoing path and updates the link status table and the link aggregation status table in accordance with whether the link is active or inactive.

2. The packet forwarding device according to claim 1, wherein the path selection processor acquires, when the flag acquired from the path selection table in accordance with the flow number of the packet acquired from the incoming path indicates that the link is not made up of the plurality of physical lines, a link number of a Work path and a Protection path from the path selection table in accordance with the flow number to refer to the link status table, selects the Work path or the Protection path which is active, and acquires destination information of the selected path from the path selection table.

3. The packet forwarding device according to claim 2, wherein
the path selection table further includes, for each flow number, a validation bit that indicates whether the path in the Work path and Protection path is valid or not even subsequent to another packet forwarding device adjacent to the packet forwarding device, and
the path selection processor acquires, when the flag acquired from the path selection table in accordance with the flow number of the packet acquired from the incoming path indicates that the link is not made up of the plurality of physical lines, validation bits of the Work path and the Protection path from the path selection table in accordance with the flow number of the packet acquired from the incoming path, acquires, when the validation bits of the Work path and the Protection path together indicate validity, link numbers of the Work path and the Protection path from the path selection table in accordance with the flow number of the packet acquired from the incoming path to refer to the link status table, selects the Work path or the Protection path of which the corresponding link is active, acquires destination information of the selected path from the path selection table, selects, when one of the validation bits of the Work path and the Protection path indicates validity, selects the valid path, and acquires destination information of the selected path from the path selection table.

4. The packet forwarding device according to claim 1, further comprising a table display unit that makes a predetermined display unit output contents of the various types of tables stored in the storage.

5. A packet forwarding device that performs switching between a Work path and a Protection path of an MPLS network, the packet forwarding device comprising:
a storage that stores therein
a path selection table in which adjacent node numbers of the Work path and Protection path, a flag that indicates whether a link between the nodes is made up of a plurality of physical lines, a link aggregation number that identifies an aggregation of the plurality of physical lines, and destination information are set in association with one another for each flow number of a transfer packet,
a node status table in which the node number and a status that indicates whether the node is active or inactive are set in association with each other, and
a link aggregation status table in which the link aggregation number and a value that indicates whether all of the plurality of physical lines corresponding to the link aggregation number are active are set in association with each other;
a path selection processor that acquires, when the flag acquired from the path selection table in accordance with a flow number of a packet acquired from an incoming path indicates that the link between the adjacent nodes is made up of a plurality of physical lines, link aggregation numbers of a Work path and a Protection path from the path selection table in accordance with the flow number to refer to the link aggregation status table, selects the Work path or the Protection path of which all the physical lines are active, and acquires destination information of the selected path from the path selection table;
a transfer controller that transmits the received packet to an outgoing path decided by the destination information acquired by the path selection processor; and
a monitor that monitors statuses of a link and a node on each outgoing path and updates the node status table and the link aggregation status table in accordance with whether the link and node are active or inactive.

6. The packet forwarding device according to claim 5, wherein the path selection processor acquires, when the flag acquired from the path selection table in accordance with the flow number of the packet acquired from the incoming path indicates that the link between the adjacent nodes is not made up of the plurality of physical lines, a node number of a Work path and a Protection path from the path selection table in accordance with the flow number to refer to the node status table, selects the Work path or the Protection path which is active, and acquires destination information of the selected path from the path selection table.

7. The packet forwarding device according to claim 6, wherein
the path selection table further includes, for each flow number, a validation bit that indicates whether the path in the Work path and Protection path is valid or not even subsequent to another packet forwarding device adjacent to the packet forwarding device, and
the path selection processor acquires, when the flag acquired from the path selection table in accordance with the flow number of the packet acquired from the incoming path indicates that the link between the adjacent nodes is not made up of the plurality of physical lines, validation bits of the Work path and the Protection path from the path selection table in accordance with the flow number of the packet acquired from the incoming path, acquires, when the validation bits of the Work path and the Protection path together indicate validity, node numbers of the Work path and the Protection path from the path selection table in accordance with the flow number of the packet acquired from the incoming path to refer to the node status table, selects the Work path or the Protection path of which the corresponding node is active, acquires destination information of the selected path from the path selection table, selects, when one of the validation bits of the Work path and the Protection path indicates validity, selects the valid path, and acquires destination information of the selected path from the path selection table.

8. The packet forwarding device according to claim 5, further comprising a table display unit that makes a predetermined display unit output contents of the various types of tables stored in the storage.

9. A control circuit for controlling a packet forwarding device that performs switching between a Work path and a Protection path of an MPLS network, the control circuit comprising:
a storage that stores therein
a path selection table in which link numbers of the Work path and Protection path, a flag that indicates whether the link is made up of a plurality of physical lines, a link aggregation number for identifying an aggregation of the plurality of physical lines, and destination information are set in association with one another for each flow number of a transfer packet,
a link status table in which the link number and an active or inactive state of the corresponding link are set in association with each other, and
a link aggregation status table in which the link aggregation number and a value that indicates whether all of the plurality of physical lines corresponding to the link aggregation number are active are set in association with each other;

a path selection processor that acquires, when the flag acquired from the path selection table in accordance with a flow number of a packet acquired from an incoming path indicates that the link is made up of a plurality of physical lines, link aggregation numbers of a Work path and a Protection path from the path selection table in accordance with the flow number to refer to the link aggregation status table, selects the Work path or the Protection path of which all the physical lines are active, and acquires destination information of the selected path from the path selection table;

a transfer controller that transmits the received packet to an outgoing path decided by the destination information acquired by the path selection processor; and a monitor that monitors a status of a link on each outgoing path and updates the link status table and the link aggregation status table in accordance with whether the link is active or inactive.

10. The control circuit according to claim 9, wherein the path selection processor acquires, when the flag acquired from the path selection table in accordance with the flow number of the packet acquired from the incoming path indicates that the link is not made up of the plurality of physical lines, a link number of a Work path and a Protection path from the path selection table in accordance with the flow number to refer to the link status table, selects the Work path or the Protection path which is active, and acquires destination information of the selected path from the path selection table.

* * * * *

UNITED STATES PATENT AND TRADEMARK OFFICE
CERTIFICATE OF CORRECTION

PATENT NO. : 8,264,950 B2
APPLICATION NO. : 12/827456
DATED : September 11, 2012
INVENTOR(S) : Koji Hachiya et al.

It is certified that error appears in the above-identified patent and that said Letters Patent is hereby corrected as shown below:

Title Page, Item (75) should read:

Inventors: Koji Hachiya, Fukuoka (JP); Tetsuo Ehara, Fukuoka (JP); Yasuyuki Mitsumori, Kawasaki (JP)

Signed and Sealed this
Sixth Day of November, 2012

David J. Kappos
*Director of the United States Patent and Trademark Office*